(12) United States Patent
Oba

(10) Patent No.: US 10,787,219 B2
(45) Date of Patent: Sep. 29, 2020

(54) ELECTRIC VEHICLE DRIVE DEVICE

(71) Applicant: HONDA MOTOR CO., LTD., Minato-ku, Tokyo (JP)

(72) Inventor: Hiroaki Oba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 16/088,109

(22) PCT Filed: Mar. 31, 2016

(86) PCT No.: PCT/JP2016/060802
§ 371 (c)(1),
(2) Date: Sep. 25, 2018

(87) PCT Pub. No.: WO2017/168716
PCT Pub. Date: Oct. 5, 2017

(65) Prior Publication Data
US 2020/0031294 A1 Jan. 30, 2020

(51) Int. Cl.
*B62K 11/04* (2006.01)
*B60R 16/02* (2006.01)
(Continued)

(52) U.S. Cl.
CPC .......... *B62K 11/04* (2013.01); *B60R 16/0215* (2013.01); *B62K 25/14* (2013.01);
(Continued)

(58) Field of Classification Search
CPC ....... B62M 7/12; B62K 11/04; B60R 16/0215
See application file for complete search history.

(56) References Cited

U.S. PATENT DOCUMENTS 8,360,188 B2 * 1/2013 Yonehana ............ B62K 25/005
180/220
8,915,325 B2 * 12/2014 Kikuchi .................. B62J 11/19
180/220
(Continued)

FOREIGN PATENT DOCUMENTS

EP 1 122 159 A2 8/2001
EP 1 389 579 A1 2/2004
(Continued)

OTHER PUBLICATIONS

Extended European search report dated Mar. 14, 2019 issued in corresponding EP patent application No. 16896933.5.

*Primary Examiner* — Kevin Hurley
(74) *Attorney, Agent, or Firm* — Carrier Blackman & Associates, P.C.; William D. Blackman; Joseph P. Carrier

(57) ABSTRACT

An electric vehicle drive device includes a swing arm including an arm portion disposed on a left side, having a front part pivotally supported by a pivot shaft, and including a main wall having a height and extending in a front-rear direction, and a cross arm portion which has a front part pivotally supported by the pivot shaft, and including a coupling portion extending toward the left side to the main wall. A guide hole penetrating through the main wall in a vehicle width direction is formed between a part pivotally supported by the pivot shaft and a part in which the coupling portion extends. A harness extends along a side of the main wall on the left side, passes through the guide hole, and extends along the cross arm portion.

4 Claims, 4 Drawing Sheets

(51) Int. Cl.
*B62K 25/14* (2006.01)
*B62M 7/12* (2006.01)
*B62J 43/00* (2020.01)

(52) U.S. Cl.
CPC ............... *B62M 7/12* (2013.01); *B62J 43/00* (2020.02); *B62K 2204/00* (2013.01)

(56) References Cited

U.S. PATENT DOCUMENTS

| | | | |
|---|---|---|---|
| 9,193,410 B2* | 11/2015 | Watanabe | ............... B62J 11/00 |
| 2004/0079574 A1* | 4/2004 | Ono | ............... B62M 7/12 180/252 |
| 2012/0000720 A1 | 1/2012 | Honda et al. | |
| 2013/0168173 A1 | 7/2013 | Kikuchi | |

FOREIGN PATENT DOCUMENTS

| | | | | |
|---|---|---|---|---|
| JP | 04292284 A | * | 10/1992 | ........... B62K 25/005 |
| JP | H06-247374 A | | 9/1994 | |
| JP | 2010-247811 A | | 11/2010 | |
| WO | 2012/067110 A1 | | 5/2012 | |

* cited by examiner

ELECTRIC VEHICLE DRIVE DEVICE

TECHNICAL FIELD

The present invention relates to an electric vehicle drive device.

BACKGROUND ART

In a known drive device of an electric vehicle such as an automatic two-wheel vehicle, a drive motor configured to drive a rear wheel is housed in a swing arm supported by a vehicle body frame in a swingable manner in the vertical direction. In such a drive device, a harness extending from the drive motor toward the front side needs to be disposed so that the harness does not interfere with a vehicle body component when the swing arm swings.

Patent Literature 1 discloses to provide an extension cover extended from the swing arm toward the front side, and to guide the harness by this extension cover.

CITATION LIST

Patent Literature

Patent Literature 1: WO 2012/067110

SUMMARY OF INVENTION

Technical Problem

However, in the technology disclosed in Patent Literature 1, the extension cover needs to be separately provided. Furthermore, the length of the harness is increased in some cases to avoid interference with a vehicle body component positioned above the swing arm.

The present invention has been made under such circumstances and aims at providing an electric vehicle drive device in which a harness can be disposed so that the harness does not interfere a vehicle body component when a swing arm swings, without an additional separate component.

Solution to Problem

An electric vehicle drive device according to the present invention includes: a vehicle body frame; a pivot shaft pivotally supported by a pivot portion included in the vehicle body frame; a swing arm including an arm portion and a cross arm portion, the arm portion being disposed on one side in a vehicle width direction, having a front part pivotally supported by the pivot shaft, and including a wall extending in a front-rear direction, and the cross arm portion having a front part pivotally supported by the pivot shaft, and including a coupling portion extending in the one side in the vehicle width direction to the wall; a drive motor disposed at a rear part of the arm portion and configured to drive a rear wheel; and a harness extending from the drive motor toward a front side. A guide hole is formed in a region between the pivot shaft and the coupling portion in the wall, the guide hole penetrating through the wall in the vehicle width direction. The harness extends along a side of the wall on the one side in the vehicle width direction, passes through the guide hole, and extends along the cross arm portion.

According to the present invention, since the guide hole through which the harness passes is formed near the pivot shaft, deflection is unlikely to occur to the harness when the swing arm swings. Moreover, since the harness is disposed between the pivot shaft and the cross arm portion, the harness can be prevented from interfering with the vehicle body frame and a vehicle component attached thereto when the swing arm swings.

In the present invention, it is preferable that at least a part of the harness is disposed between the pivot shaft and the cross arm portion.

With this configuration, since at least a part of the harness is disposed at such a position, the harness can be prevented from interfering with a vehicle body component. Moreover, since the harness is difficult to be visually recognized from the side, aesthetically improved appearance can be obtained.

In the present invention, it is preferable that a first harness fixing portion configured to fix the harness is provided at a position offset from a center of a front side of the coupling portion in the vehicle width direction toward the one side in the vehicle width direction, and a second harness fixing portion configured to fix the harness is provided at a position above the pivot shaft on a side opposite to the one side in the vehicle width direction with respect to a center of the vehicle body frame in the vehicle width direction.

With this configuration, since one of the fixing portions configured to fix the harness is disposed on the one side in the vehicle width direction with respect to the center in the vehicle width direction and the other fixing portion is disposed on the side opposite to the one side in the vehicle width direction with respect to the center in the vehicle width direction, deflection of the harness when the swing arm swings occurs between the pivot shaft and the cross arm portion. Accordingly, the harness can be prevented from interfering with a vehicle body component. Moreover, since the harness is difficult to be visually recognized from the side, aesthetically improved appearance can be obtained.

In the present invention, it is preferable that the arm portion includes an upper wall and a lower wall extending from an upper end part and a lower end part, respectively, of the wall toward the one side in the vehicle width direction, and is opened on the one side in the vehicle width direction, a cover is provided to cover the opened arm portion, and the cover covers the guide hole on the one side in the vehicle width direction.

With this configuration, the guide hole can be visually recognized by removing the cover, which facilitates attachment work of the harness.

In the present invention, it is preferable that the vehicle body frame includes a head pipe, a main frame extending from the head pipe toward a rear side, a seat rail extending from a rear part of the main frame toward the rear side, a pivot frame extending downward from the rear part of the main frame, and a subframe connecting the seat rail and the pivot frame, a control device is disposed along the seat rail, the control device includes a connection portion to which the harness is connected, and the connection portion is provided at the control device above the second harness fixing portion on a side opposite to the one side in the vehicle width direction.

With this configuration, the connection portion of the control device, to which the harness is connected, is positioned above the second harness fixing portion, which enables to reduce influence on the control device caused by pulling due to deflection occurring to the harness when the swing arm swings. Moreover, the control device can be positioned near the guide hole, which allows reduction of the length of the harness without increasing the size of the swing arm.

DESCRIPTION OF EMBODIMENT

The following describes a drive device of an automatic two-wheel vehicle 100 according to an embodiment of an electric vehicle of the present invention with reference to the accompanying drawings. In the following description, directions such as front, rear, left, and right directions are identical to directions of a vehicle body of the automatic two-wheel vehicle 100. The following describes a case in which one side in the vehicle width direction according to the present invention is the left side, and the other side opposite to the one side in the vehicle width direction according to the present invention is the right side, but the left and right sides may be inversely defined.

Figure 1:
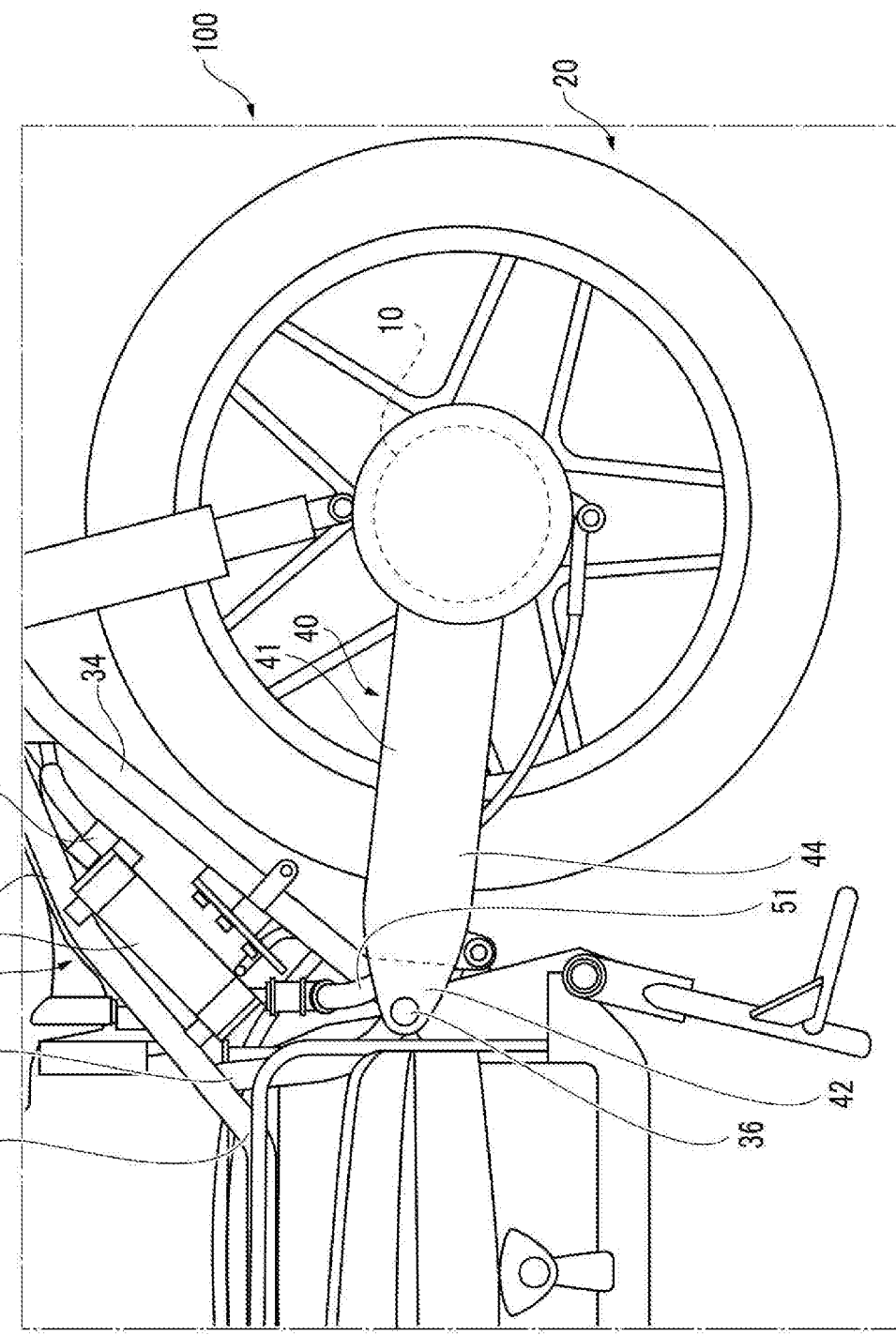
FIG. 1 is a side view illustrating a drive device of an automatic two-wheel vehicle according to an embodiment of the present invention.

As illustrated in FIG. 1, the automatic two-wheel vehicle 100 is an electric straddling-type vehicle configured to travel when a drive motor 10 is driven by electrical power from a battery (not illustrated) mounted thereon, and a rear wheel 20 disposed on the right side of the drive motor 10 is driven by this drive power. The rear wheel 20 as a drive wheel is disposed at the center in the vehicle left-right direction and provided as a component separated from the drive motor 10.

A vehicle body frame 30 as a main framework of the automatic two-wheel vehicle 100 is formed by integrating a plurality of steel members such as steel pipes through junction such as welding. The vehicle body frame 30 includes a head pipe (not illustrated) at a front part of the vehicle body, a main frame 31 extending from the head pipe to the rear side, a seat rail 32 extending from a rear part of the main frame 31 to the rear side, a pivot frame 33 extending downward from the rear part of the main frame 31, and a subframe 34 connecting the seat rail 32 and the pivot frame 33. Although not illustrated, a structure that supports a front wheel suspension system and allows operation of the direction of the system is provided at a front part of the head pipe.

The seat rails 32 are a pair of left and right pipe members having leading ends joined with the rear part of the main frame 31. Each pivot frame 33 includes a pair of left and right pipe like frame portions 33a, and a pivot portion 33b joined with a rear end of the frame portion 33a. The pair of left and right frame portions 33a have leading ends joined with front parts of the seat rails 32. The pivot portion 33b is a pipe member having an axis line in the vehicle width direction (left and right direction). The pivot portions 33b are also joined with rear ends of the subframes 34 having leading ends joined with the pair of left and right seat rails 32. The pivot portions 33b pivotally support a central part of a pivot shaft 36.

A swing unit 40 is pivotally supported by a lower rear part of the vehicle body frame 30 in a swingable manner in the vertical direction. With this configuration, a rear wheel suspension system is supported by the vehicle body frame 30 in a swingable manner in the vertical direction.

Figure 2:
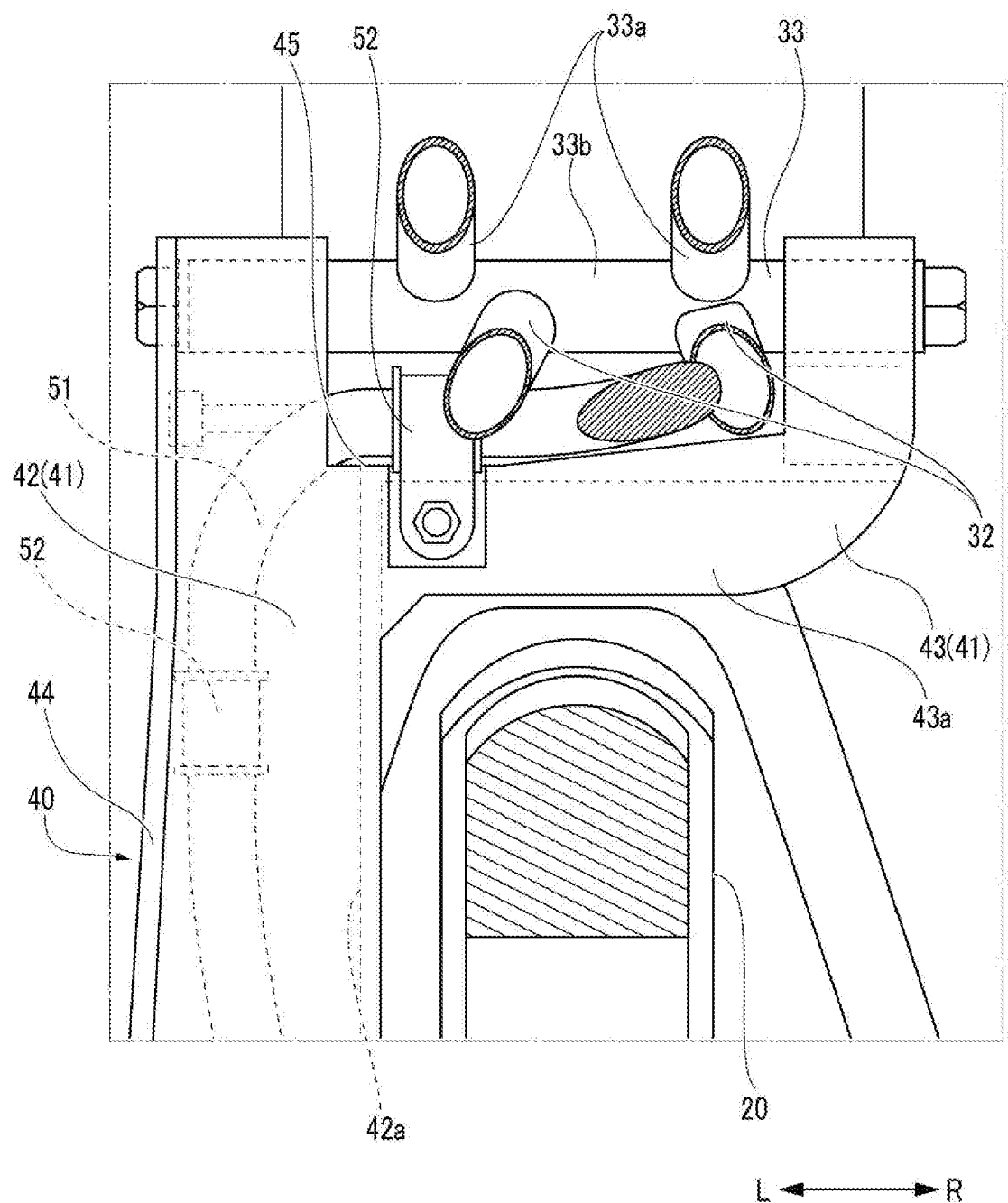
FIG. 2 is a top view illustrating the vicinity of a pivot shaft.

As illustrated in FIG. 2, the swing unit 40 has a front part pivotally supported by the vehicle body frame 30 in a swingable manner, and a rear part pivotally supporting the rear wheel 20 in a rotatable manner. The swing unit 40 includes a swing arm 41 as a main framework. The swing unit 40 includes, in addition to the swing arm 41, the drive motor 10, and the rear wheel 20, for example, a decelerator (not illustrated) configured to decelerate drive power from the drive motor 10 and transfer the decelerated drive power to the rear wheel 20.

The swing arm 41 includes an arm portion 42 extending from a front end part of the swing arm 41 toward the rear side to the vicinity of the rear wheel 20, and a cross arm portion 43 extending rightward from a front part of the arm portion 42, and substantially has an L shape in plan view. The arm portion 42 is disposed on the left side of the center in the vehicle width direction.

A through-hole in which the pivot shaft 36 is inserted is formed at a front end part of the arm portion 42, serving as a support for a left end part of the pivot shaft 36. Another through-hole in which the pivot shaft 36 is inserted is formed at a right part of the cross arm portion 43, serving as a support for a right end part of the pivot shaft 36. The cross arm portion 43 includes a coupling portion 43a coupling the supports of the pivot shaft 36 from the vehicle rear side.

In this manner, the swing arm 41 is pivotally supported by these supports and hence the vehicle body frame 30 through the pivot shaft 36 in a swingable manner. Accordingly, the entire swing unit 40 is pivotally supported by the vehicle body frame 30 in a swingable manner.

The cross arm portion 43 includes a plurality of ribs 43b formed to achieve strength.

The arm portion 42 includes a main wall 42a having a height and extending the front-rear direction, and an upper wall 42b and a lower wall 42c extending leftward from upper and lower end parts of the main wall 42a, respectively. Accordingly, the arm portion 42 has a case shape opened on the left side. This opening is covered by a cover 44 detachably attached to the arm portion 42 from the left side with a plurality of bolts or the like. The main wall 42a corresponds to a wall according to the present invention.

The drive motor 10 and part of a harness 51 extending from the drive motor 10 toward the front side and connected with a control device 50 are housed in a space formed between the arm portion 42 and the cover 44. In addition, a structure in which the decelerator is disposed is formed on the right side of a rear part of the arm portion 42.

The harness 51 is obtained by covering, with a protection tube, three electrical power lines connected with U-phase, V-phase, and W-phase winding wires, respectively, of the drive motor 10 as a three-phase alternating-current brushless motor, and a signal line connected with a sensor configured to sense the position of a rotor.

A guide hole 45 in which the harness 51 is inserted is formed, as a through-hole penetrating through the main wall 42a in the vehicle width direction, in the main wall 42a at the front part of the arm portion 42. The guide hole 45 is formed in a region sandwiched between the pivot shaft 36 and the through-holes of the cross arm portion 43 in the front-rear direction.

In this manner, since the guide hole 45 in which the harness 51 is inserted is formed near the pivot shaft 36, deflection is unlikely to occur to the harness 51 when the swing arm 41 swings. Moreover, since the harness 51 is disposed between the pivot shaft 36 and the cross arm portion 43, the harness 51 can be prevented from interfering with the vehicle body frame 30 and a vehicle component attached thereto when the swing arm 41 swings.

The guide hole 45 is covered from the left side by the cover 44. With this configuration, the guide hole 45 can be visually recognized by removing the cover 44, which facilitates attachment work of the harness 51.

The harness 51 extending from the drive motor 10 toward the front side is positioned near the drive motor 10 by a clip 46 provided to the arm portion 42. The harness 51 is also positioned by a clamp 52 attached to the harness 51 through a grommet and fixed, by a bolt or the like, to a screw hole (not illustrated) formed in the main wall 42a at the front part of the arm portion 42. With this configuration, the harness 51 extends toward the front side along the left side of the main wall 42a of the arm portion 42, passes through the guide hole 45, and extends outward from the swing arm 41.

The clamp 52 attached to the harness 51 through a grommet is fixed, by a bolt or the like, to a screw hole (not illustrated) formed in an upper surface wall of the cross arm portion 43 of the swing arm 41. This screw hole is formed at a position offset from the center in the vehicle width direction toward the left side on which the guide hole 45 is positioned. The screw hole corresponds to a first harness fixing portion according to the present invention.

Figure 3:
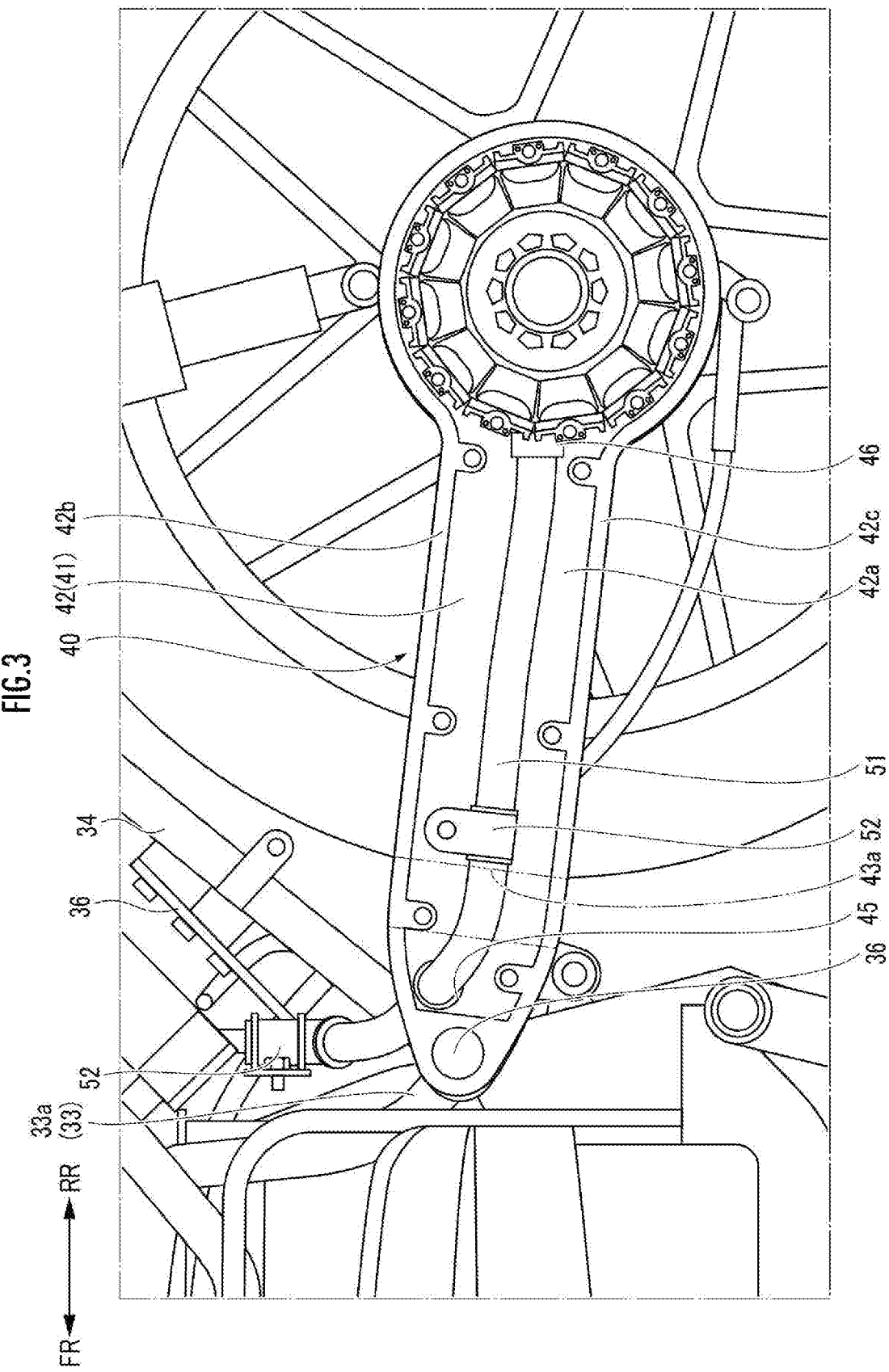
FIG. 3 is a side view illustrating the vicinity of a crank arm unit when a cover is removed.
Figure 4:
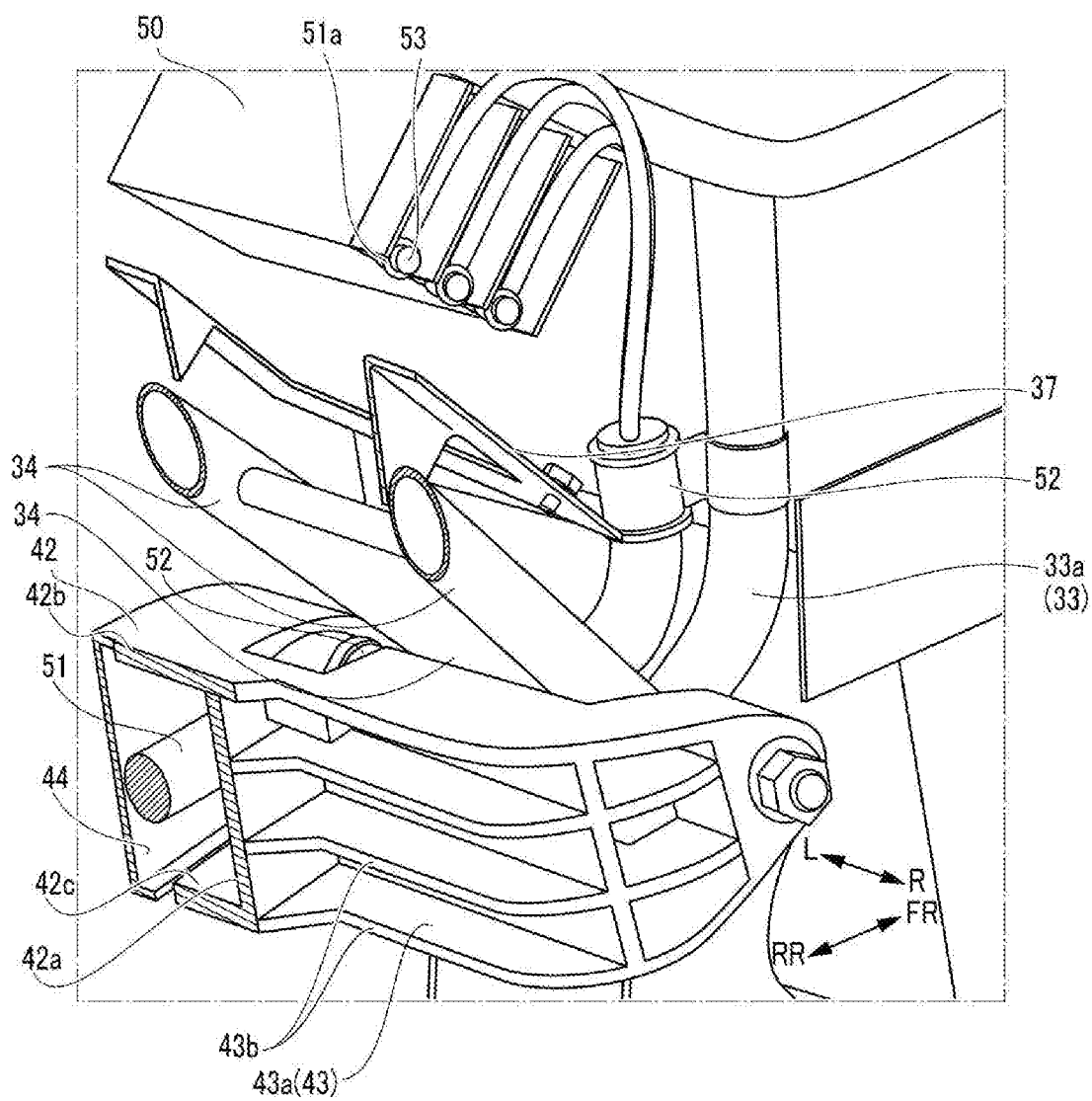
FIG. 4 is a perspective view illustrating the vicinity of the pivot shaft from a rear side.

Accordingly, as illustrated in FIG. 3, at a part externally exposed right beside the swing arm 41, the harness 51 is disposed along the upper surface of the cross arm portion 43 in a region sandwiched between the pivot shaft 36 and the coupling portion 43a (part between dashed and double-dotted lines in FIG. 3) of the cross arm portion 43 in the front-rear direction in side view. Since the harness 51 is disposed at such a position, the harness 51 can be prevented from interfering with a vehicle body component. Moreover, since the harness 51 is unlikely to be visually recognized from the side, aesthetically improved appearance can be obtained.

As described above, the plurality of ribs 43b are formed in the cross arm portion 43. When disposed through the inside of the cross arm portion 43, the harness 51 is extended out of a right end part of the cross arm portion 43. In the present embodiment, the harness 51 can be shortened as compared to such a configuration. Moreover, the formation of the ribs 43b improves the strength of the swing arm 41.

In addition, a part of the vehicle body frame 30 on the right side of the center in the vehicle width direction, specifically, the right subframe 34 is joined with a bracket 37 in which a screw hole (not illustrated) for fixing the harness 51 is formed. This screw hole is positioned above the pivot shaft 36. The clamp 52 attached to the harness 51 through a grommet is fixed to the screw hole by a bolt or the like. The screw hole corresponds to a second harness fixing portion according to the present invention.

With this configuration, since one of the fixing portions (two screw holes) to which the harness 51 is fixed is disposed on the left side of the center in the vehicle width direction and the other fixing portion is disposed on the right side of the center in the vehicle width direction, deflection of the harness 51 occurs between the pivot shaft 36 and the cross arm portion 43 when the swing arm 41 swings. Accordingly, the harness 51 can be prevented from interfering with a vehicle body component. Moreover, since the harness 51 is unlikely to be visually recognized from the side, aesthetically improved appearance can be obtained.

The control device 50 is disposed along the seat rails 32 at lower parts of the seat rails 32. The control device 50 includes, for example, a DC-DC converter, a battery management device (BMU), and a power drive unit (PDU) configured to control the drive motor 10. The control device 50 includes a connection portion (connector) 53 connected with a terminal 51a provided at leading ends of the three electrical power lines of the harness 51. The connection portion 53 is disposed on a right side surface of the control device 50 above the screw hole of the bracket 37.

With this configuration, the connection portion 53 connected with the terminal 51a of the harness 51 is positioned above the screw hole of the bracket 37, which reduces influence on the control device 50 caused by pulling due to deflection occurring to the harness 51 when the swing arm 41 swings. Moreover, the control device 50 is positioned near the guide hole 45, which allows reduction of the length of the harness 51 without increasing the size of the swing arm 41.

A connector portion 54 between a main harness and the control device 50 is configured to receive connection of a terminal from above. This configuration allows a worker to disconnect the connector portion 54 without moving up the control device 50.

REFERENCE SIGNS LIST

10 ... drive motor, 20 ... rear wheel, 30 ... vehicle body frame, 31 ... main frame, 32 ... seat rail, 33 ... pivot frame, 33a ... frame portion, 33b ... pivot portion, 34 ... subframe, 36 ... pivot shaft, 37 ... bracket, 40 ... swing unit, 41 ... swing arm, 42 ... arm portion, 42a ... main wall (wall), 42b ... upper wall, 42c ... lower wall, 43 ... cross arm portion, 43a ... coupling portion, 43b ... rib, 44 ... cover, 45 ... guide hole, 46 ... clip, 51 ... harness, 51a ... terminal, 52 ... clamp, 53 ... connection portion, 100 ... automatic two-wheel vehicle (electric vehicle).

The invention claimed is:

1. An electric vehicle drive device, the drive device comprising:
   a vehicle body frame;
   a pivot shaft pivotally supported by a pivot portion included in the vehicle body frame;
   a swing arm including an arm portion and a cross arm portion, the arm portion being disposed on one side in a vehicle width direction, having a front part pivotally supported by the pivot shaft, and including a wall extending in a front-rear direction, and the cross arm portion having a front part pivotally supported by the pivot shaft, and including a coupling portion extending in the one side in the vehicle width direction to the wall;
   a drive motor disposed at a rear part of the arm portion and configured to drive a rear wheel; and
   a harness extending from the drive motor toward a front side, wherein
   a guide hole is formed in a region between the pivot shaft and the coupling portion in the wall, the guide hole penetrating through the wall in the vehicle width direction, and
   the harness extends along a side of the wall on the one side in the vehicle width direction, passes through the guide hole, is fixed by a first harness fixing portion provided at a front side of the coupling portion, and extends along the cross arm portion,
   wherein at least a part of the harness is disposed between the pivot shaft and the cross arm portion.

2. The electric vehicle drive device according to claim 1, wherein
   the arm portion includes an upper wall and a lower wall extending from an upper end part and a lower end part, respectively, of the wall toward the one side in the vehicle width direction, and is opened on the one side in the vehicle width direction, a cover is provided to cover the opened arm portion, and the cover covers the guide hole on the one side in the vehicle width direction.

3. An electric vehicle drive device, the drive device comprising:
a vehicle body frame;
a pivot shaft pivotally supported by a pivot portion included in the vehicle body frame;
a swing arm including an arm portion and a cross arm portion, the arm portion being disposed on one side in a vehicle width direction, having a front part pivotally supported by the pivot shaft, and including a wall extending in a front-rear direction, and the cross arm portion having a front part pivotally supported by the pivot shaft, and including a coupling portion extending in the one side in the vehicle width direction to the wall;
a drive motor disposed at a rear part of the arm portion and configured to drive a rear wheel; and
a harness extending from the drive motor toward a front side, wherein
a guide hole is formed in a region between the pivot shaft and the coupling portion in the wall, the guide hole penetrating through the wall in the vehicle width direction, and
the harness extends along a side of the wall on the one side in the vehicle width direction, passes through the guide hole, is fixed by a first harness fixing portion provided at a front side of the coupling portion, and extends along the cross arm portion,
wherein the first harness fixing portion is provided at a position offset from a center of a front side of the coupling portion in the vehicle width direction toward the one side in the vehicle width direction,
and wherein a second harness fixing portion configured to fix the harness is provided at a position above the pivot shaft on a side opposite to the one side in the vehicle width direction with respect to a center of the vehicle body frame in the vehicle width direction.

4. An electric vehicle drive device, the drive device comprising:
a vehicle body frame;
a pivot shaft pivotally supported by a pivot portion included in the vehicle body frame;
a swing arm including an arm portion and a cross arm portion, the arm portion being disposed on one side in a vehicle width direction, having a front part pivotally supported by the pivot shaft, and including a wall extending in a front-rear direction, and the cross arm portion having a front part pivotally supported by the pivot shaft, and including a coupling portion extending in the one side in the vehicle width direction to the wall;
a drive motor disposed at a rear part of the arm portion and configured to drive a rear wheel; and
a harness extending from the drive motor toward a front side, wherein
a guide hole is formed in a region between the pivot shaft and the coupling portion in the wall, the guide hole penetrating through the wall in the vehicle width direction, and
the harness extends along a side of the wall on the one side in the vehicle width direction, passes through the guide hole, is fixed by a first harness fixing portion provided at a front side of the coupling portion, and extends along the cross arm portion,
wherein:
the arm portion includes an upper wall and a lower wall extending from an upper end part and a lower end part, respectively, of the wall toward the one side in the vehicle width direction, and is opened on the one side in the vehicle width direction,
a cover is provided to cover the opened arm portion,
the cover covers the guide hole on the one side in the vehicle width direction,
the vehicle body frame includes a head pipe, a main frame extending from the head pipe toward a rear side, a seat rail extending from a rear part of the main frame toward the rear side, a pivot frame extending downward from the rear part of the main frame, and a subframe connecting the seat rail and the pivot frame,
a control device is disposed along the seat rail,
the control device includes a connection portion to which the harness is connected, and
the connection portion is provided at the control device above the second harness fixing portion on a side opposite to the one side in the vehicle width direction.

* * * * *